United States Patent [19]
Yang

[11] Patent Number: 5,503,786
[45] Date of Patent: Apr. 2, 1996

[54] METHOD FOR FORMING AIR CHAMBER IN SHOE SOLE

[76] Inventor: Kuo-Nan Yang, No. 94, Lane 52, Fu Der Road, Su Wang Village, Da Li City, Taichung Hsien, Taiwan

[21] Appl. No.: 515,207

[22] Filed: Aug. 15, 1995

[51] Int. Cl.⁶ .......................... B29C 44/06; B29C 44/12
[52] U.S. Cl. ................. 264/46.4; 264/45.1; 264/46.5; 264/279.1; 156/79
[58] Field of Search .................. 264/46.4, 46.5, 264/46.7, 45.1, 279.1; 156/79

[56] References Cited

U.S. PATENT DOCUMENTS

| | | |
|---|---|---|
| 1,193,608 | 8/1916 | Poulson . |
| 1,605,985 | 11/1926 | Rasmussen . |
| 2,772,196 | 11/1956 | Pouley ........................... 156/79 |
| 4,237,625 | 12/1980 | Cole et al. ....................... 36/28 |
| 4,296,053 | 10/1981 | Doerer et al. ................... 264/46.4 |
| 4,358,902 | 11/1982 | Cole et al. ....................... 36/28 |
| 4,418,483 | 12/1983 | Fujita et al. ..................... 264/45.1 |
| 4,446,634 | 5/1984 | Johnson et al. ................. 36/29 |
| 4,458,430 | 7/1984 | Peterson .......................... 36/28 |
| 4,577,417 | 3/1986 | Cole ............................... 36/29 |
| 4,581,187 | 4/1986 | Sullivan et al. ................. 264/46.4 |
| 4,605,455 | 8/1986 | Lai .................................. 264/46.4 |
| 4,674,204 | 6/1987 | Sullivan et al. ................. 264/46.4 |
| 4,817,304 | 4/1989 | Parker et al. ................... 36/114 |
| 4,829,682 | 5/1989 | Gasbarro ........................ 36/29 |
| 5,141,578 | 8/1992 | Yang .............................. 264/46.4 |
| 5,147,589 | 9/1992 | Chang et al. ................... 264/45.1 |
| 5,308,420 | 5/1994 | Yang .............................. 264/46.4 |
| 5,318,645 | 6/1994 | Yang .............................. 264/46.4 |
| 5,453,230 | 9/1995 | McClellan et al. ............. 264/46.7 |

Primary Examiner—Allan R. Kuhns
Attorney, Agent, or Firm—Charles E. Baxley

[57] ABSTRACT

A method for forming an air chamber in a shoe sole includes disposing a film between two EVA sheet materials and hot-pressing the sheet materials so as to fuse the sheet materials together. The film prevents the sheet materials from being fused together so as to form a gap between the sheet materials. The air generated during hot-pressing and foaming process is accumulated in the gap so as to form an air chamber in the shoe sole such that the air chamber can be formed in the shoe sole without air bags and without injecting pressurized air into the shoe soles.

5 Claims, 2 Drawing Sheets

5,503,786

METHOD FOR FORMING AIR CHAMBER IN SHOE SOLE

BACKGROUND OF THE INVENTION

1. Field of the Invention

The present invention relates to a method, and more particularly to a method for forming an air chamber in a shoe sole.

2. Description of the Prior Art

Typical pneumatic shoe soles comprise an air chamber formed in the shoe sole so as to form a shock absorption configuration. The pneumatic shoe soles are disclosed in the following prior arts: U.S. Pat. Nos. 1,193,608 to Poulson; 1,605,985 to Rasmussen; 4,237,625 to Cole et al.; 4,358,902 to Cole et al.; 4,446,634 to Johnson et al.; 4,458,430 to Peterson; 4,577,417 to Cole; 4,817,304 to Parker et al.; and 4,829,682 to Gasbarro. However, in these patents, it is difficult to form the air chambers in the shoe soles. For example, an air bag or a pocket is required to be engaged in the shoe soles of some of the prior arts so as to form the air chamber. The other patents are required to secure two of the shoe sole pieces together so as to form the air chamber. However, the air chambers may be easily broken. The further patents are required to inject pressurized air into the shoe soles so as to form the air chambers. However, a number of facilities are required for injecting the pressurized air into the shoe soles.

The present invention has arisen to mitigate and/or obviate the afore-described disadvantages of the conventional pneumatic shoe soles.

SUMMARY OF THE INVENTION

The primary objective of the present invention is to provide a method for forming an air chamber in a shoe sole without air bag and without injecting pressurized air into the shoe soles.

In accordance with one aspect of the invention, there is provided a method for forming an air chamber in a shoe sole, the method comprises preparing at least two sheet materials of EVA materials, the sheet materials each including a middle portion, disposing a film between the sheet materials and in the middle portions of the sheet materials, and hot-pressing the sheet materials in order to foam the sheet materials and in order to fuse the sheet materials together. The film prevents the middle portions of the sheet materials from being fused together so as to form a gap between the sheet materials, and air generated during hot-pressing and foaming process is accumulated in the gap so as to form an air chamber in the middle portions of the shoe sole, such that the air chamber can be formed in the shoe sole without air bags and without injecting pressurized air into the shoe soles.

The film includes a melting point greater than that of the EVA sheet materials and is made of either PP, PVC or paper materials.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
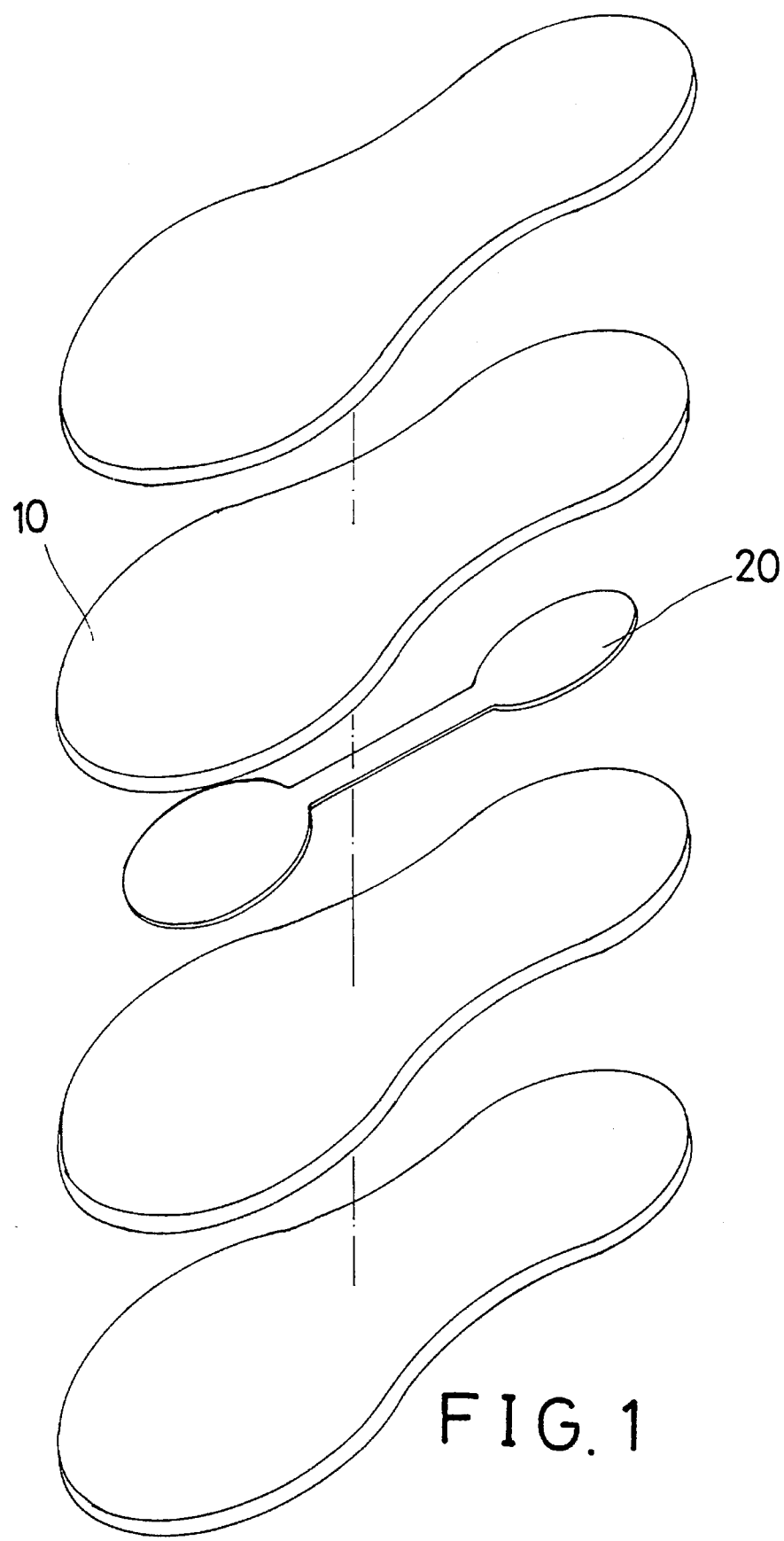
FIG. 1 is an exploded view of a number of materials for forming a shoe sole in accordance with the present invention.

Referring to the drawings, and initially to FIG. 1, a method for forming an air chamber in a shoe sole in accordance with the present invention comprises preparing a number of sheet materials 10 which are cut into the shoe sole shapes and which are made of ethylene-vinyl acetate copolymer (abbreviated as EVA hereinafter). For example, four sheet materials 10 are provided and shown in FIG. 1. The EVA materials are commonly used for forming the shoe soles. The sheet materials 10 of EVA materials may be fused and secured together after hot-pressing processes. The method further provides a film 20 of smaller size than that of the sheet materials 10 and arranged between the sheet materials 10. The film 20 may be made of either of polypropylene (abbreviated as PP hereinafter), polyvinyl chloride (abbreviated as PVC hereinafter), or paper material, which includes a higher melting temperature than that of the EVA materials.

Figure 2:
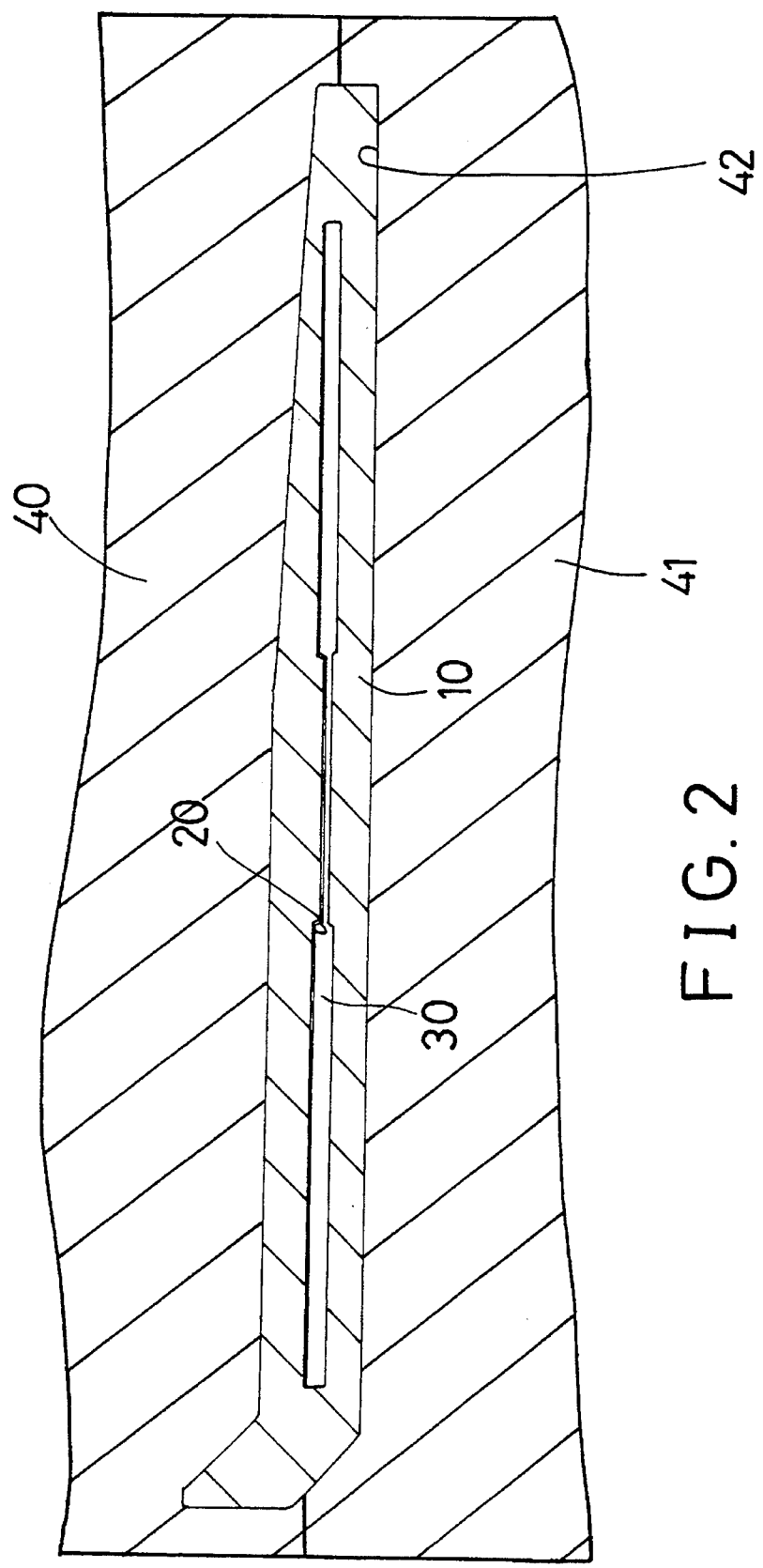
FIG. 2 is a cross sectional view illustrating the formation of the shoe sole.

Referring next to FIG. 2, the sheet materials are then disposed in a mold cavity 42 of a mold device including an upper mold 40 and a lower mold 41. The mold device 40, 41 is then heated to a suitable temperature in order to hot-press the sheet materials 10. It is to be noted that the sheet materials 10 of EVA materials may be foamed and may be fused and secured together in order to form the shoe sole after hot-pressing processes. However, the PP, PVC and the paper materials will not be fused and secured together with the EVA material, such that the portion of the sheet materials 10 surrounding the film 20 may be fused together and such that the film 20 may form a gap or an air chamber 30 in the middle portion of the shoe sole. The EVA materials of the sheet materials 10 may be foamed and may generate air during the hot-pressing processes. The air generated in the hot-pressing or foaming process has a tendency to be accumulated in the gap so as to form the air chamber 30.

Accordingly, the method in accordance with the present invention may be provided for forming an air chamber in a shoe sole without air bags and without injecting pressurized air into the shoe soles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for forming an air chamber in a shoe sole, said method comprising:

preparing at least two sheet materials of EVA materials, said sheet materials each including a middle portion, disposing a film between said sheet materials at middle portions of said sheet materials, and hot-pressing said sheet materials in order to foam said sheet materials and in order to fuse said sheet materials together at portions surrounding said middle portions, said film preventing said middle portions of said sheet materials from being fused together so as to form a gap between said sheet materials, and air generated during hot-pressing and foaming being accumulated in said gap so as to form an air chamber in said middle portions of said shoe sole.

2. A method according to claim 1, wherein said film has a melting point greater than that of said EVA sheet materials.

3. A method according to claim 2, wherein said film is made of PP materials.

4. A method according to claim 2, wherein said film is made of PVC materials.

5. A method according to claim 2, wherein said film is made of paper materials.

\* \* \* \* \*